Oct. 25, 1955 R. P. DIMMER 2,721,988
SELECTIVE SIGNALLING SYSTEM
Filed Dec. 11, 1952
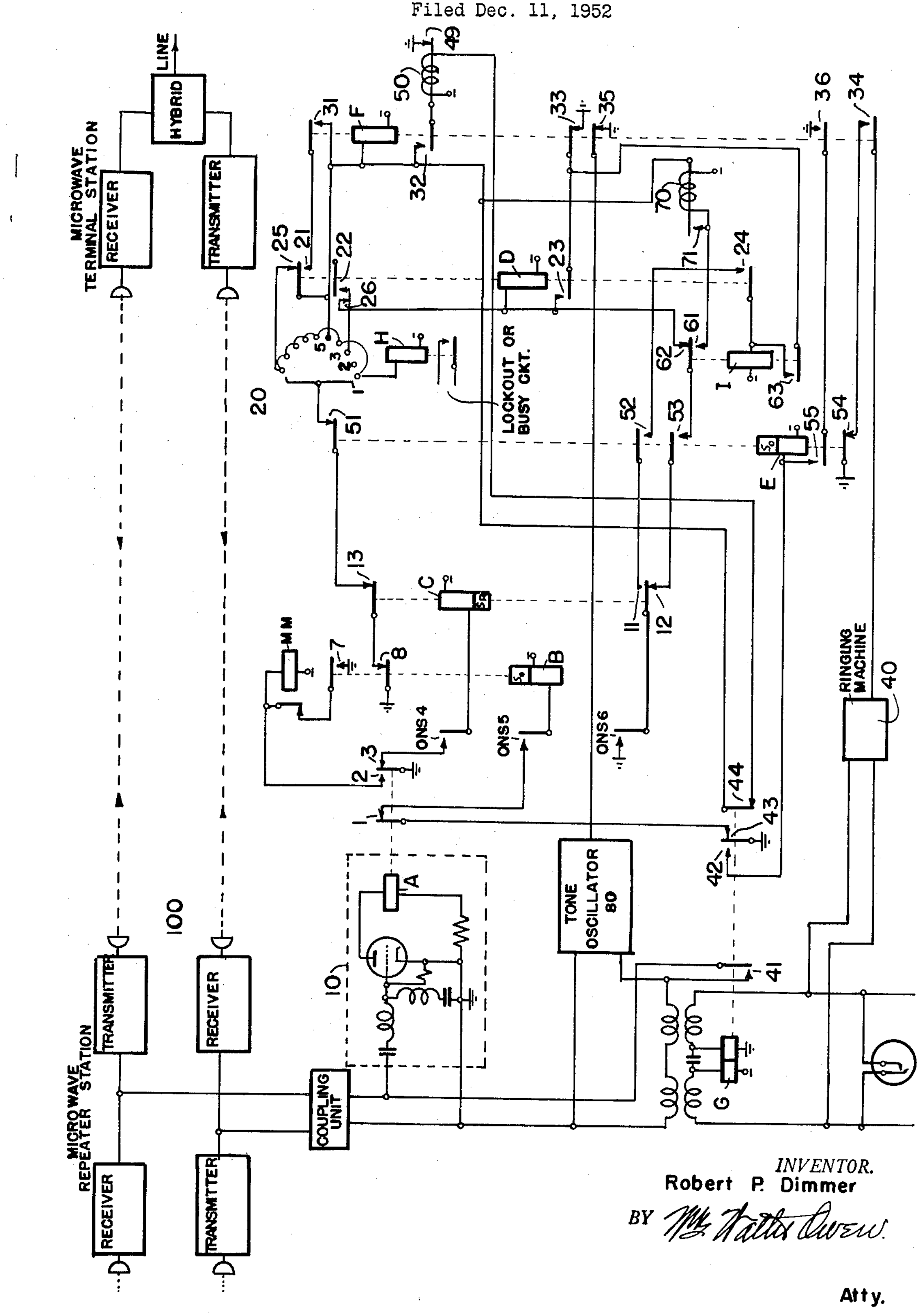
INVENTOR.
Robert P. Dimmer
BY [signature]
Atty.

United States Patent Office 2,721,988

Patented Oct. 25, 1955

2,721,988

SELECTIVE SIGNALLING SYSTEM

Robert P. Dimmer, Lombard, Ill., assignor to Automatic Electric Laboratories, Inc., Chicago, Ill., a corporation of Delaware Application December 11, 1952, Serial No. 325,486

10 Claims. (Cl. 340—164)

The present invention relates in general to a selective signalling system which may be used for providing selective ringing and calling in microwave installations or other radio links, telephone line or railway line signalling systems. More specifically it relates to such a system in which certain common equipment is operated on an incoming call for controlling a signal at a called station and is operated on an outgoing call from said station for controlling electrical pulsations used for calling another station.

Among the objects of this invention are the reduction in the cost of a selective signalling unit by reduction of the amount of necessary equipment; reliable signal operation and reduction in the power requirements in such a signalling unit.

One of the features of this invention lies in the use of certain circuit arrangements whereby certain control functions are performed by equipment operated by both incoming and outgoing electrical pulsations.

Another feature of this invention is the circuit arrangement for limiting the length of time during which outgoing modulating electrical pulsations can be transmitted so that power use is reduced to a minimum necessary to provide a complete outgoing call.

Another feature relates to the counting of outgoing digits dialled by a calling party for establishing a connection to another station and thereafter preventing the operation of the means whereby these digits may be dialled.

Another feature relates to the limiting of the duration of time for signalling at a called station once the appropriate series of incoming electrical pulsations are received so that a minimum of power will be used in the signalling operation.

These circuits are designed primarily to provide selective ringing and calling for microwave installations in the pipe line field. However it should be readily apparent that they may be adapted for use in connection with mobile radio links and other types of transmission systems using selective signalling.

The present embodiment discloses one of a plurality of receiver-transmitter stations each of which would be a duplicate of the one shown herein. The particular station disclosed herein is shown merely as a repeater station for transmitting a series of electrical pulsations which in this case modulate a carrier frequency to signal a terminal station in any well known manner and be signalled in the same manner. The equipment provided at this station is generally well known and includes a radio receiver and transmitter, a tone detector, an ordinary telephone with a dial, a tone oscillator, a ringing machine, and a rotary selector switch.

The selective signalling system used herein is of the type wherein each station is assigned a two digit call number and a calling party dials a first digit to step the rotary selector switch at all stations including the called party's station by means of a series of successive tone splashes, each series corresponding to a digit of the number of the called party's station. The wiper of the selector at the called station stops on a corresponding contact and a circuit is completed for preparing the selective signalling unit for further operation. Dialling of the second digit again steps said selector to a corresponding position and if this digit corresponds to the second digit of the called number of that station a second circuit is completed for causing a ringing machine or another device to operate a signal at that station to thereby attract the attention of the called party. After a period of time sufficient to attract the attention of the called party a thermal switch operates for causing the ringing machine circuit to be opened and thereby limit the power drain. The rotary switch used herein is a ten point switch of which one contact is left unconnected for a purpose to be described and the system provides connections for a maximum of 100 subscribers or stations on the basis of a two digit call number for each station.

As installations of this type may be extremely expensive and involve a large amount of complicated equipment and large use of power it is desirable to simplify the equipment and reduce power drain as much as possible especially as the power supply at the stations may be limited. In this system thermal switches operating after a period of five seconds are used to control the circuits in such a manner as to limit the power drain on both incoming and outgoing calls. On outgoing calls the calling party dials two digits to signal the desired called party. The carrier wave is modulated by tone splashes in accordance with each digit dialled. The tone splashes are also fed back over the incoming tone detector circuit at the calling party's station for operating certain of the same control equipment operated on an incoming call and thereby count the digits dialled on an outgoing call. A thermal switch is operated a predetermined time period after the second digit is dialled to cause other of said same control equipment to terminate the operation of the oscillator and thereby reduce the power drain thus enabling said control equipment to perform the dual function of automatically controlling the use of power on both incoming and outgoing calls.

Referring to the drawings, I have illustrated a typical receiver-transmitter combination 100 at a repeater station in block form together with the various equipment aforementioned, and the circuits whereby the objects of this invention are accomplished.

On initiation of a call a tone modulated carrier frequency is rectified by the tone detector 10 and operates relay A in any manner well known in the art. Relay A closes contacts 2 and opens contacts 1 and 3. When the carrier current is successively modulated by tone splashes corresponding to dial pulses, relay A pulses a number of times corresponding to the digits of the dialled number to operate contacts 1, 2 and 3 a corresponding number of times. On receipt of the tone modulated carrier signal at the other stations, the relays at those stations corresponding to relay A operate to operate contacts at those stations corresponding to 1, 2 and 3. Those relays at other stations corresponding to relay A are also pulsed by the tone splashes to operate their contacts a corresponding number of times. At contacts 2 an energizing circuit for the motor magnet of the selector switch 20 is completed. The motor magnet deenergizes on each opening of contacts 2 as relay A is pulsed by successive tone splashes to step the selector switch to a position corresponding to the digit dialled by the calling party. As selector switch 20 is stepped from its first contacts off-normal springs 4, 5 and 6 close. Relay A on deenergization closes circuits for relays B and C through off-normal springs 4 and 5. Relay B however is slow-to-operate and does not operate until the tone modulation of the carrier signal ceases at the calling station. Relay C operates on the first pulse as contacts 3 close and as it is slow-to-release it remains operated during the dialling of the first digit. Similar operations take place at all other stations. If the first digit dialled corresponds to the first digit of the called number of the station shown the wiper of selector switch 20 is stepped in this example to contact 3 and completes a circuit for operating relay D after relay C releases to close contact 13 at the end of the digit. If the wiper is stepped to contact 5 on the first digit, a circuit will be completed through back contacts 25 of relay D to the lockout relay H. If the wiper is on any of the other contacts, a circuit will be completed to relay H which on operating will operate a lockout circuit or busy signal (not shown).

At the end of the first digit dialled the tone signal modulating the carrier frequency will hold relay A operated thereby holding contact 2 closed and holding contacts 1 and 3 open. Relay C therefore releases and a circuit is completed if the wiper of switch 20 is on its third contact for operating relay D. Relay D closes contacts 21, 22, 23 and 24. Closing of contacts 21 prepares a circuit for the operation of relay F. Closing of contacts 22 breaks the previous operating circuit for relay D, however it is held operated over contacts 23. Contacts 24 close for no purpose on an incoming call.

Dialling of the second digit again steps selector switch 20 as previously described. If the second digit dialled does not correspond to the number of this particular station a circuit is completed for relay H which operates for a purpose previously described. If however the wiper of selector switch 20 is stepped to contact 5, then at the end of the digit and on release of relay C a circuit is completed over previously prepared contacts 21 for operating relay F. Relay F on operating closes contacts 31, 32, 34 and 36 and opens contacts 33 and 35. Closing of contacts 32 provides a locking circuit for relay F and an energizing circuit for thermal switch 50, and closing of contacts 34 operates the ringing machine 40 for ringing the called party. Opening of contacts 35 prevents operation of the tone oscillator 80. Opening of contacts 33 breaks the locking circuit for relay D and it releases. Five seconds after the ringing machine 40 has been operated thermal switch 50 operates over contacts 44 and 32 and breaks the locking circuit for relay F at contacts 49 causing it to release and open contacts 34 to thereby open the operating circuit for the ringing machine 40 to limit the power drain to this short interval of time.

If the called party lifts his handset before the five second interval has elapsed line relay G will operate and close contacts 42 to operate slow-to-operate relay E. It will also open contacts 43 and 44. Opening of contacts 43 prevents the operation of relay B and the selector switch 20 will not be stepped home as yet. Opening of contacts 44 prevents the operation of the thermal switch 50 and relay F will remain operated. Relay E on operating at contacts 54 will open the circuit to the ringing machine 40. At the conclusion of the conversation when the called party replaces his handset relay G will release and the original operating circuit for relay E be opened, however it will be held operated over contacts 36 and 55. By this time the tone oscillator at the calling party's station has ceased modulating the carrier frequency as the tone oscillator at the calling station is held operated only five seconds after the second digit is dialled in a manner to be explained. Relay A will therefore have released and closed contacts 1 and 3 to prepare a circuit for relay B and operate relay C while opening the circuit to the motor magnet MM at contacts 2 to cause the selector switch 20 to be stepped one step. Operation of relay C prevents any circuit from being completed over the switch wiper. On release of relay G the operating circuit for thermal switch 50 will be reestablished and after five seconds will open contact 49 to cause the release of relay F which in turn opens contact 36 to release relay E. Release of relay G also closes the operating circuit for relay B through contacts 43, 1 and off-normal springs 5 which relay on operating closes contact 7 to complete a homing circuit for magnet MM of selector switch 20 which on being stepped home opens off-normal springs 4, 5 and 6 to open the circuits to relays B and C.

If the called party does not remove his handset until after the elapse of the five second time interval when relays F and A have been released, circuits for relays B and C will be completed as previously described and selector switch 20 has been stepped home under the influence of relay B while relay C prevents the completion of any circuits over the switch wiper. When the selector switch 20 reaches its home position the circuits for relay B and C are opened and they release as previously described. Now the called party on removal of his handset causes the tone oscillator 80 to be operated and coupled to the output circuit of station 100 at contacts 41 on the operation of relay G as relays G and E are operated on removal of the handset. Slow-to-operate relay E is operated over an obvious circuit by relay G at contacts 42. As tone oscillations are fed into detector 10, relay A will be operated and the motor magnet of switch 20 will be energized. The called party on hearing tone in his handset will then be required to dial two digits to remove this tone to improve transmission and the digit 1 will result in stepping the switch 20 to its first contact in a manner already described and on release of relay C at the end of the digit a circuit will be completed to relay D over off-normal springs 6, contacts 12, 53 and 62. Operated relay E at contact 51 will prevent a circuit from being completed over the switch wiper. Dialling of another digit 1 by the called party will result in stepping switch 20 to its second contact. This contact 2 is left blank on the selector switch 20 at all stations for the described purpose. As relay C, D and E are operated during the dialling of the digits in a manner described a circuit will be completed for relay I over off-normal springs 6, contacts 11, 52 and 24 which relay locks operated over its contacts 63. Relay I now prepares a point in the circuit to thermal relay 70 at contacts 61. Contact 12 is closed as relay C is released at the end of the second dialled digit and five seconds later thermal relay 70 operates over off-normal springs 6, contacts 12, 53 and 61 and completes a circuit to relay F over off-normal springs 6, contacts 12, 53, 61 and 71 which relay on operating breaks the circuit to relay D and I at contacts 33 and terminates the operation of the tone oscillator 80 at contacts 35 so that the conversation may proceed. After completion of the conversation the release operation is as previously described. The described dialling operation will be more fully described in the discussion of an outgoing call which proceeds in exactly the same manner with exception that digits other than the predetermined digits 1, 1 will be dialled.

An outgoing call would be initiated in any well known manner by removing the handset and proceeding to dial. Removal of the handset completes a circuit for line relay G which closes contacts 41 and 42 and opens contacts 43 and 44. Closing of contacts 41 completes a circuit for the output of the tone oscillator 80 so that the carrier wave now emanating from the transmitter will be modulated by the tone oscillator 80. As relay G is pulsed by dialling to in turn pulse contacts 41 the carrier wave is splashed by a series of successive tone pulses corresponding in number to the dialled digit. Part of the output of the tone oscillator 80 will be fed back into the tone detector 10 for operating the relay A. Closing of contacts 42 operates slow-to-operate relay E which closes contacts 52, 53 and 55 and opens contacts 51 and 54. As the first digit is dialled, the selector switch 20 is stepped as relay A follows the dialled pulses. When selector switch 20 takes its first step the off-normal springs are operated and a point in a circuit is prepared at off-normal springs 6 for operating relay D. Relay C is operated as dialling proceeds and closes contacts 11 for no immediate purpose.

At the end of the dialling of the first digit, contacts 12 are closed as relay C releases as previously described and relay D now operates over previously prepared off-normal springs 6, contacts 12, 53 and 62. Thus the first outgoing digit is counted. No circuit will be completed over the switch wiper as relay E is operated during the entire duration of the outgoing call and has opened contacts 51. Relay D which is operated as described closes and opens its previously described contacts. At contacts 24 it prepares a point in the circuit for operating relay I.

Dialling of the next digit by the calling subscriber on an outgoing call will again result in stepping the selector wiper as described. On relay C reoperating contact 11 is closed and relay I now operates over off-normal springs 6, contact 11, contact 52 and contacts 24. Relay I on operating closes contacts 61 and 63. Opening of contacts 62 by operation of relay I opens the previous operating circuit for relay D, however it has locked up over contact 23. Closing of contacts 61 prepares a point in the circuit for thermal switch 70. Contacts 63 on operating complete a locking circuit for relay I. Relay C on releasing at the end of the second dialled digit opens contact 11 and closes contacts 12. Contact 12 on closing now completes a circuit for operating thermal switch 70 over contacts 12, 53 and 61. After a five second interval thermal switch 70 operates and completes a circuit for relay F over the aforementioned contacts and contact 71. Relay F on operating breaks the locking circuit for relays D and I as previously described at contacts 33 thus counting the second outgoing digit. At contacts 35 it opens the operating circuit for the tone oscillator 80 and at contacts 32 completes its own locking circuit. Thermal switch 50 however does not operate as contacts 44 are held open by relay G. At the end of the conversation when the calling party replaces his handset relay G is released. Relay E however is held operated over contacts 55 and 36 to prevent the operation of ringing machine 40. Relay C reoperates and relay B operates all as previously described. Relay B on operating completes the homing circuit for the motor magnet of selector switch 20 and it returns home and opens the off-normal spring contacts. Contacts 44 are closed on release of relay G and complete a circuit for thermal switch 50 and after a five second interval it operates and opens contacts 49 to break the locking circuit for relay F. Relay F releases and the unit is restored to normal.

Having thus described my invention and its manner of operation it is clearly seen that the circuit arrangements operated on both incoming and outgoing calls may be adapted for wide use.

What is claimed is:

1. In a selective signalling system including a number of stations each having an individual call number and each having apparatus for the generation, transmission and reception of electrical pulsations, means at each station operated in accordance with said electrical pulsations, and a signal at each station, said signal at one station operated by said means at said station to signal said station if said means is operated by a predetermined number of received electrical pulsations corresponding to the call number of said station, said means also operated by another number of transmitted pulsations to terminate the further transmission of electrical pulsations.

2. In a selective signalling system including a number of stations having individual call numbers assigned thereto and each having apparatus for the generation, transmission and reception of electrical pulsations, a stepping switch at each station operated in accordance with a received series of electrical pulsations, means at each station operated only if said switch is operated by numbers of said received pulsations corresponding to the call numbers of said station, and a signal at each station operated by said operated means for signalling said station, said means further comprising a counting arrangement operated by other numbers of transmitted electrical pulsations for terminating the generation of electrical pulsations.

3. In a selective signalling system including a number of stations each having individual call numbers, means at each station operated in accordance with received and transmitted electrical pulsations, a second means operated by said first means if operated by a number of received electrical pulsations corresponding to a first number of one of said individual call numbers, a third means operated by said first means if operated by a second number of electrical pulsations corresponding to a second number of one of said individual call numbers, and if said second means has been operated, a signal at each station operated by said operated third means, said first means operating said second and third means in the same sequence on the transmission from one station of numbers of pulsations not corresponding to the call number of said station to terminate the transmission of pulsations from said station, a thermal switch, and a circuit completed for energizing said thermal switch on operation of said third means for terminating the operation of said third means and said signal after a predetermined time.

4. In a selective signalling system having apparatus for the generation, transmission and reception of electrical pulsations, means operated in accordance with a series of electrical pulsations, a signal operated by said means if operated by a predetermined series of received electrical impulses, a thermal relay, a circuit for energizing said thermal relay, means controlled by said first means for completing said circuit to cause said relay to terminate said signal after a predetermined period of time, said first means including a second circuit, said first means operated by the generation and transmission of a predetermined number of series of electrical pulsations to complete said second circuit, a second thermal relay energized over said second circuit, part of said first means operated by said second thermal relay for thereby causing the termination of the generation and transmission of said electrical pulsations.

5. In a selective signalling system including a number of stations each having individual call numbers and each having an electrical transmission system and apparatus for generating, transmitting and receiving electrical pulsations over said transmission system and apparatus operated in accordance with electrical pulsations either sent out or received over said transmission system, means at one station operated by said last apparatus if a series of electrical pulsations corresponding to the first number of the call numbers individual to said station are received over said transmssion system or a series of electrical pulsations are sent out over said transmission system, another means at said station operated if said first means is operated and another series of electrical pulsations corresponding to the second number of the call numbers individual to said station are received over said transmission system or if said first means is operated and a second series of electrical pulsations are sent out over said transmission system, a signal at said station operated by said operated other means if said electrical pulsations are received, and means operated by said other means when operated by said second series of pulsations sent out over said system for terminating the generation of electrical pulsations.

6. In a selective signalling unit having a transmission system and apparatus operated in accordance with electrical pulsations sent or received over said transmission system, an oscillator, means for operating said oscillator if electrical pulsations are to be sent and for transmitting said pulsations over said system, said means having provision for causing said pulsations to be sent serially, a relay, a circuit for operating said relay, means controlled by said apparatus if operated in accordance with a predetermined series of electrical pulsations received over said system for completing said circuit, another circuit for operating said relay, means controlled by said apparatus if operated by a series of electrical pulsations sent over said system for completing said other circuit to operate said relay, a second relay, a second circuit completed by said apparatus for operating said second relay if operated by a second predetermined series of electrical pulsations received over said system after said first relay has been operated by receipt of said first series of received predetermined electrical pulsations, a third circuit completed by said apparatus on the sending of a second series of pulsations by said first means for operating said second relay after said first relay has been operated by the transmission of a first series of electrical impulses, a signal, a circuit completed for operating said signal if said second relay is operated on receipt of said second predetermined series of impulses, and means for terminating the operation of said oscillator if said second relay is operated by said second series of transmitted electrical pulsations.

7. In a selective signalling system having a number of stations each having an individual call number assigned thereto and having coupled transmission and receiving apparatus and an oscillator at each station for generating electrical current to be sent over said transmission apparatus, means for operating said oscillator and for transmitting said current in pulses, said apparatus including means for receiving incoming pulses, a switch operated in accordance with said incoming pulses, a signal at each station, and means operated by said switch when operated in accordance with certain predetermined incoming electrical pulsations corresponding to the individual call number of a station for operating the associated signal to signal said station, said last means also operated for terminating the operation of said oscillator if said first means has been operated for causing said oscillator to transmit electrical pulsations serially over said apparatus.

8. In a selective signalling system having apparatus for the generation, transmission and reception of electrical pulsations, means operated in accordance with a series of received or transmitted successive electrical pulsations, a relay, a circuit completed for operating said relay by said means if operated by a received predetermined series of electrical impulses, a second relay, a second circuit completed for said relay by said means if operated by a second received predetermined series of electrical impulses and if said first relay has been operated by said first predetermined series of electrical impulses, a signal operated by said second relay, a thermal relay, a third circuit completed by said second relay for energizing said thermal relay to thereby terminate the operation of said second relay and said signal after a predetermined time, means operated on the generation and transmission of a first series of electrical impulses, a fourth circuit completed by said operated last means for operating said first relay, a second thermal relay, a fifth circuit completed by said first operated relay and said last means if said last means is operated on generation and transmission of a second series of electrical pulsations for energizing said second thermal relay, and a circuit completed after a predetermined time by said second thermal relay for operating said second relay to thereby terminate the generation and transmission of electrical impulses.

9. In a selective signalling system, a transmission line, a plurality of stations connected thereto, each station having means for transmitting and receiving coded pulses over said line to select and signal another of said stations, means in each station responsive only to a received particular code of pulses individual to a station to signal said station, means in each station for generating current for the transmission of said coded pulses, and means at said station operated on receipt of said particular code of pulses for terminating said signal after a predetermined time, said last means also operated upon each outgoing call for terminating the operation of said generating means after a predetermined time to thereby terminate the transmission of pulses.

10. In a selective signalling system including a number of stations having an individual call number and each having apparatus for the generation, transmission and reception of electrical pulsations, a signal at each station, means at each station operated in accordance with a received number of electrical pulsations, said means operating its associated signal only if said received number corresponds to the call number of its station to signal said station, said means including means operated for terminating the operation of said signal after a predetermined time interval, said apparatus operated for generating and transmitting a number of electrical pulsations for operating said first means, said first means operated in accordance with another predetermined number of electrical pulsations generated and transmitted for terminating the generation and transmission of said pulsations after a predetermined time interval.

References Cited in the file of this patent

UNITED STATES PATENTS

| | | |
|---|---|---|
| 1,662,877 | Almquist | Mar. 20, 1928 |
| 1,913,188 | Bruckel et al. | June 6, 1933 |
| 1,970,455 | Humphries | Aug. 14, 1934 |
| 2,063,354 | Thorp | Dec. 8, 1936 |
| 2,411,091 | Henderson | Nov. 12, 1946 |